United States Patent Office 3,280,978
Patented Oct. 25, 1966

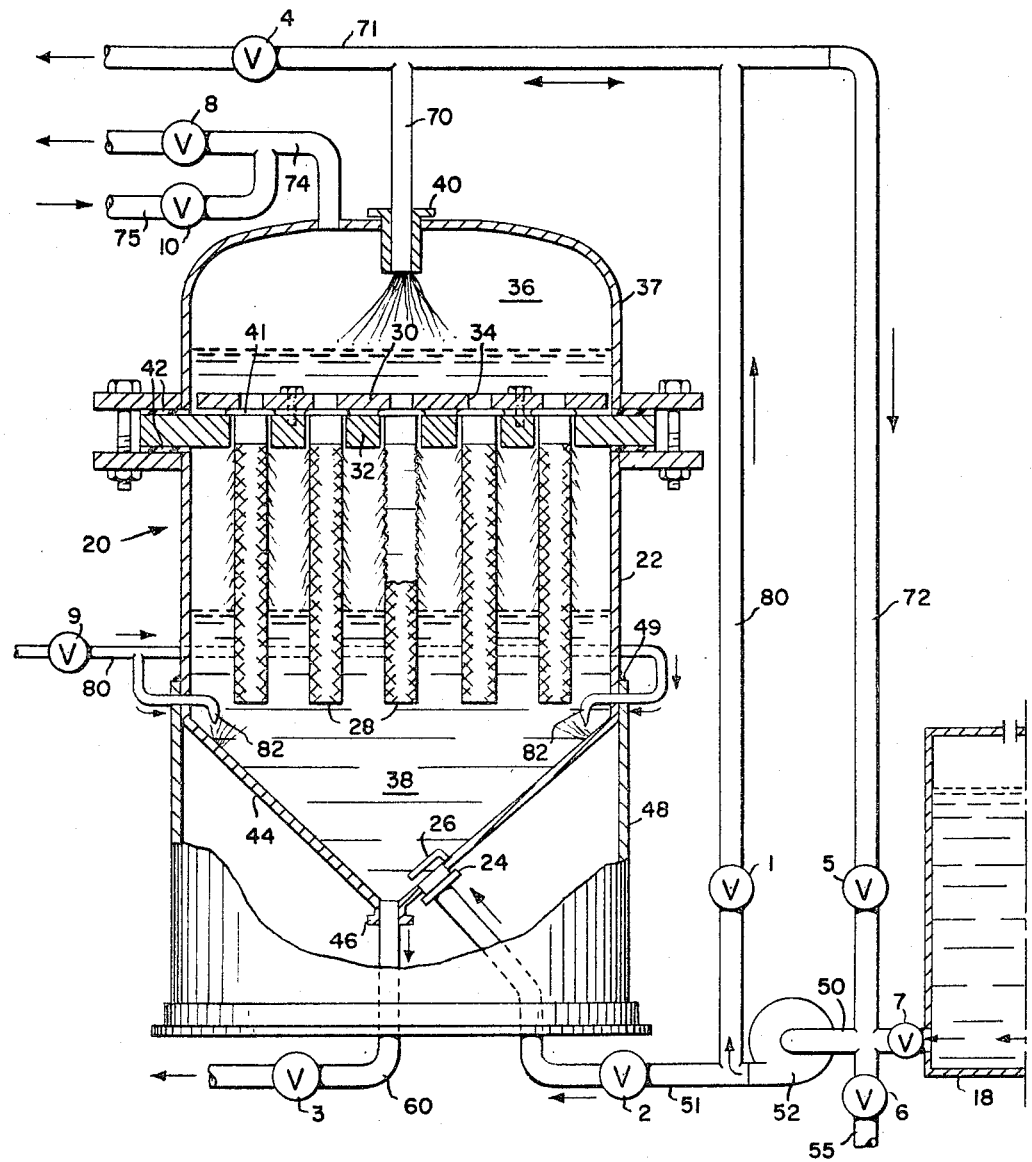

3,280,978
FILTERING PROCESS
Winfield H. Scott, Knoxville, Tenn., assignor to De Laval
Turbine Inc., Trenton, N.J., a corporation of Delaware
Filed Feb. 5, 1964, Ser. No. 342,655
7 Claims. (Cl. 210—82)

This invention relates generally to improvements in filtering systems which involve a backwashing operation for removing accumulated filter cake from the filtering means or septa.

One of the problems involved in filtering systems of the indicated type is that it is difficult to remove completely from the filtering means the cake accumulated thereon during a filtering operation.

Heretofore it has been the general practice to remove the accumulated filter cake by pressurizing the filter tank by passing liquid into the tank by way of the inlet while maintaining the outlet closed so that when the outlet is opened there is a sudden surge of liquid in the reverse direction through the filtering means. This reverse flow serves to dislodge the filter cake from the filtering means. While this procedure serves to remove a substantial portion of the filter cake from the filter means, some of the filter cake remains on the filtering means. Since this would decrease the efficiency of a subsequent filtering operation, it is the general practice in prior devices to have a second pressurizing and draining operation to remove more of the filter cake. Besides the additional time and liquid involved in this second step, there is the disadvantage that some of the dislodged filter cake which remains in the filter tank would pass through the filter during the subsequent pressurizing step and contaminate the outlet chamber of the filter tank.

It is the general object of this invention to provide a filtering process involving improved backwashing so that the filter cake on the filter tubes is removed completely. Briefly stated, this object of the invention is accomplished by the introduction of air into the filter inlet chamber while liquid is flowing through the filter tubes in the reverse direction filling the inlet chamber. The air is introduced by means of one or more jets which agitate the liquid violently so that it scrubs the filter tubes on the outside while the reverse flow is flushing the tube from the inside. Accordingly, a very effective filter cake removal is achieved.

The above and other objects and features of the invention will become apparent from the following description when read in conjunction with the accompanying drawing in which the single figure is a diagrammatic illustration of the filtering system provided in accordance with this invention.

The filtering system in accordance with this invention comprises a plurality of valves indicated at 1, 2, 3, 4, 5, 6, 7, 8, 9 and 10. The arrangement and operation of these valves will be described fully hereinafter.

The storage tank for the liquid to be filtered is indicated at 18 and the filter proper is indicated generally at 20. Filter 20 comprises a lower tank section 22 which receives the suspension to be filtered through an inlet connection 24 controlled by a baffle 26. Tank section 22 contains a plurality of vertically extending, tubular filter elements 28 which are positioned throughout the filter cross-section. The liquid entering tank section 22 through inlet 24 is diverted by baffle 26 which serves to minimize the turbulence in tank section 22 so that the accumulated filter cake on elements 28 will not be disturbed and break off. Filter elements 28 are supported at their upper ends between a pair of horizontal supporting plates 30 and 32. The upper plate 30 has a plurality of openings 34 communicating with the interior of the filter elements 28 and with an outlet chamber 36 formed in a dome-shaped upper tank section 37 of filter 20. Lower tank section 22 cooperates with plate 32 to define an inlet chamber 38. Outlet chamber 36 has a fitting 40 through which the filtrate may leave filter 20 after passing from inlet chamber 38 through the filter elements 28 and outlet chamber 36.

Each filter element 28 may take the form of a mesh tube enclosed at its lower end and open at its upper end with a spiral spring contained within the tube tending to uncoil so as to maintain the shape of the tube and prevent radial collapse thereof under external pressure. The upper end of the tube is bent over an O-ring and this bent over portion 41 and O-ring are clamped between the plates 30 and 32 to retain the filter elements 28 in their filtering position as shown in FIGURE 1. It will be apparent that various forms of filter elements may be used.

It will be apparent that the bent over portion 41 of the filter tube and the O-ring therein serve as a seal between the inlet chamber 38 and the outlet chamber 36. Suitable seals are also provided at 42 to seal the tank at the junction between the upper and lower sections thereof. The tank section 22 has a conical lower portion 44 terminating in an outlet fitting 46 which permits draining of the inlet chamber 38. The tank section 22 is supported on a cylindrical base 48 welded thereto at 49.

The liquid to be filtered is delivered from a storage tank 18 to inlet 24 of filter 20 through lines 50 and 51. A delivery pump 52 is connected between lines 50 and 51, which have connected therein filter inlet valves 7 and 2, respectively. Clean liquid may be supplied to the inlet of pump 52 by a line 55 connected between a clean liquid storage tank (not shown) and line 50. Valve 6 controls flow through line 55. The drain fitting 46 of the filter 20 is connected through a line 60 containing drain valve 3 to a drain tank (not shown).

Precoat and body feed liquid may be delivered to the system by way of a line (not shown) connected to line 51 downstream of valve 2. However, the precoating and body feed operation form no part of the present invention wherefore description thereof is deemed unnecessary. For a complete description of a precoating and body feed system which could be used, reference may be made to the application of John R. Schneider, Serial No. 9,876, filed February 19, 1960, now Patent No. 3,199,677.

Filtered liquid leaves the filter 20 by way of lines 70 and 71 connected between the outlet fitting and a clean liquid storage tank (not shown). Line 71 has the outlet valve 4 connected therein for controlling flow therethrough. The outlet of the filter 20 is connected to the intake of pump 52 for recirculation by means of a line 72 connected between line 71 and line 50 and having the recirculating valve 5 connected therein.

Means are provided for venting the outlet chamber to the exterior of the filter. Such means comprises a conduit 74 having a conventional air vent valve 8 therein.

There is provided means for introducing air under pressure into the filter. Such means comprises having a valve 10 therein and connected between a source of high pressure air and line 74 as shown in the drawing.

In accordance with the invention there is provided means for introducing jets of air into the inlet chamber 38 for producing violent agitation of the liquid therein. Such means comprises a line 80 having the air valve 9 therein and communicating with a pair of jet nozzles 82 spaced in diametrically opposed positions within the inlet chamber 38. Line 80 is connected to a source of high pressure air. The nozzles 82 direct the air jets downwardly onto member 44 so as to avoid impingement upon the filter tubes.

In the operation of the filter system in accordance with this invention, during a filter step, only the supply valve 7, the filter inlet valve 2, the outlet valve 4 and a body feed valve are open. Accordingly, the pump 52 delivers raw liquid from the storage tank 18 through lines 50 and 51, a proper mixture of body feed also being added to line 51 if desired. The mixture passes into the inlet chamber 38 of the filter. After filtration by the filter elements 28, the filtrate is passed through outlet 40 and lines 70 and 71 to the clean liquid storage tank. A suitable body feed system may take the form as described in said prior-mentioned application, Serial No. 9,876 in which a proper amount of filter aid is fed continuously from a slurry tank into the liquid to be filtered. The body feed serves to extend the effective filtering time by preventing sealing over of the filter cake by the turbidity.

In the operation of the filter system, it is necessary to terminate filtration when an excessive layer of filter cake forms on the exterior of the filter elements 28. After termination of filtering, the next procedure is to remove the filter cake. The first step in this procedure is to pressurize the filter. The pressurization of filter 20 serves to provide a sudden high velocity surge when the drain valve 3 is subsequently opened to thereby remove filter cake adhering to the exterior of tubes 28. The removed filter cake will thus be washed out the drain outlet 46. In the pressurization step, all the valves are closed with the exception of the air inlet valve 10. Air is thus forced into the filter through lines 75 and 74 to pressurize the filter (to about 75 p.s.i.).

Pressurization is followed by a blowdown and draining or backwashing step, in which only the air inlet valve 10 and the draining valve 3 are open. At the end of a preceding filter operation, the valves 2 and 4 are closed to thereby trap the filtrate in the outlet chamber and fluid to be filtered in the inlet chamber. Accordingly, when the drain valve 3 is opened, there will be a sudden surge loosening the filter cake from the tubes so that it is washed out by the trapped liquid in the filter 20. The filtrate in the outlet chamber surges through the filter elements to remove the filter cake therefrom. The air entering the discharge side of filter 20 serves to force the contents of the filter out through the drain connection 46 through line 60 and valve 3. The air also serves to "blowdown" or loosen the filter cake on the filter elements. The filter cake thus becomes suspended in the liquid within the filter and is carried thereby out through the drain line 60.

The next step in the filter cake removal procedure is the novel scrubbing step in accordance with this invention. In this step, the filling valve 1, the air scrubbing valve 9 and inlet valve 7 are open in the sequence described below. With valves 1 and 7 open, pump 52 is operated to pump liquid through line 80 and valve 1, line 71 and line 70 to the outlet chamber 36 from which liquid flows downwardly into the interior of the filter tubes 28 and through these tubes in the reverse direction into inlet chamber 38 whereby the tubes are flushed. The condition of the filter system in this step is illustrated in the drawing which shows liquid passing from outlet chamber 36 through the filter tubes 28 into the inlet chamber which is being filled. When the liquid in the inlet chamber rises to the bottom of the filter tubes 28, valve 9 is opened whereby air is delivered through the jets to the nozzles 82 in the form of jets into the inlet chamber 38. The air jets agitate the liquid violently so that it scrubs the exterior of the filter tubes. It will be noted that at the same time the reverse flow of liquid is flushing the tubes from the inside. This produces a very effective filter cake removal. The flow rate of the filling liquid is set so that each tube is flooded while being slow enough to allow for the exterior of the tubes to be scrubbed thoroughly. Since the liquid level in the inlet chamber is rising while the filter is being filled, the scrubbing and flushing continues over the entire length of the tubes. The filling valve 1 is closed when the inlet chamber 38 is filled to the level of the tube sheet. However, the air jets are allowed to continue in operation for a period sufficient to complete the scrubbing action. During the scrubbing and flushing step, the vent valve 8 is also open to permit the escape of air from the filter as the liquid level rises. The valve 8 is then closed and the filter pressurized for blowdown as described above by supplying air under pressure to the filter. After pressurization, the drain valve 3 is opened and the filter is blown down through line 60.

The next step in accordance with usual practice is that of precoating which involves injecting a preset amount of diatomaceous earth, or other filter aid, into the filter 20. The filter aid is suspended in clean or filtered liquid. The valve 8 is open to permit the escape of the pressurizing air from filter 20. The type of filter aid to be used and the details of this precoating step are more fully described in said prior-mentioned application.

In the filling and recirculating step which follows, the supply valve 7, the filter inlet valve 2 and the recirculating valve 5 are open, in addition to the vent valve 8, the other valves being closed. The pump 52 is operated and serves to recirculate the precoat suspension until all of the precoat is deposited on the filter tubes 28. The recirculating path is from the downstream end of pump 52 through control valve 2 into the inlet chamber 38 of filter 20, through the filter elements 28 into the outlet chamber 36, and through lines 70, 71 and 72, valve 5 and line 50 to the upstream end of pump 52.

During this recirculating step, the liquid to be filtered may be drawn through line 50 and delivered into the system until the filter 20 is filled. Alternately, the valve 6 may be opened and the valve 7 may be closed during the filling and recirculating step. Accordingly, clean liquid is drawn from the clean liquid storage tank whereby the amount of raw liquid which flows into the clean side of the filter is minimized.

In the precoating step and in the initial stages of the filling and recirculating step, filter aid will pass through the filter elements 28 into outlet chamber 36 until a sufficient depth of precoat is formed thereon. The recirculating step serves to allow the filter aid to bridge the openings in the screen and to form a positive filtering cake. By recirculating the liquid through the recirculating path as described above, any contaminating solids will also be recirculated (this will be a minor amount because clean liquid is used for filling) and will eventually be filtered by the precoat that is built up on the filter elements 28. The recirculating is continued until all of the filter aid is on the precoat and only clean liquid passes into the outlet chamber 36. The filter 20 is now ready for another filtering step.

While the above-described filtering system has been disclosed as involving manual operation of the various valves, it will be apparent that the operation may be controlled automatically. For example, a cam-operated timer may be used to control the valve operation in the time sequence described above.

As a result of the more efficient filter cake removal as described above, a filtering system employing the features of this invention will have a wide range of uses and will involve a minimum of manual tube cleaning.

It will be apparent that changes may be made in the construction and arrangement of parts and various modifications of details may be made without departing from the scope of the invention as defined by the following claims.

What is claimed is:

1. A filtering process comprising the steps of passing a liquid to be filtered through a filter tank having at least one tubular vertically extending septum therein and defining an inlet chamber on one side of said septum and in a lower portion of said tank and an outlet chamber on the other side of said septum and in an upper portion of said tank whereby a filter cake is built up on the inlet side of said septum during filtering, and removing the filter cake accumulated on said septum during filtering in preparation for a subsequent filtering operation, said removal operation comprising the steps of removing at least a portion of said liquid to be filtered from said inlet chamber, introducing liquid into said outlet chamber so that said liquid flows into the interior of said tubular septum and outwardly thereof into said inlet chamber to flush said septum, trapping said liquid in said inlet chamber so that the level of liquid therein rises, and concurrently with the rise of trapped liquid agitating said liquid in said inlet chamber to scrub the exterior of said septum.

2. A filtering process comprising the steps of passing a liquid to be filtered through a filter tank having a plurality of tubular vertically extending septa therein and defining an inlet chamber on one side of said septa and in a lower portion of said tank and an outlet chamber on the other side of said septa and in an upper portion of said tank whereby a filter cake is built up on the inlet side of said septa during filtering, and removing the filter cake accumulated on said septa during filtering in preparation for a subsequent filtering operation, said removal operation comprising the steps of removing at least a portion of said liquid to be filtered from said inlet chamber, introducing liquid into said outlet chamber so that said liquid flows into the interior of said tubular septa and outwardly thereof into said inlet chamber to flush said septa, trapping said liquid in said inlet chamber so that the level of liquid therein rises, and concurrently with the rise of trapped liquid introducing an air stream into said inlet chamber to agitate said liquid therein to scrub the exterior of said septa.

3. A filtering process comprising the steps of passing a liquid to be filtered through a filter tank having at least one tubular vertically extending septum therein and defining an inlet chamber on one side of said septum and in a lower portion of said tank and an outlet chamber on the other side of said septum and in an upper portion of said tank whereby a filter cake is built up on the inlet side of said septum during filtering, and removing the filter cake accumulated on said septum during filtering in preparation for a subsequent filtering operation, said removal operation comprising the steps of removing at least a portion of said liquid to be filtered from said inlet chamber, introducing liquid into said outlet chamber so that said liquid flows into the interior of said tubular septum and outwardly thereof into said inlet chamber to flush said septum, trapping said liquid in said inlet chamber so that the level of liquid therein rises, and concurrently with the rise of trapped liquid introducing a plurality of jets of air into said inlet chamber to agitate said liquid therein for scrubbing the exterior of said septum.

4. A filtering process comprising the steps of passing a liquid to be filtered through a filter tank having a plurality of tubular vertically extending septa therein and defining an inlet chamber on one side of said septa and in a lower portion of said tank and an outlet chamber on the other side of said septa and in an upper portion of said tank whereby a filter cake is built up on the inlet side of said septa during filtering, removing the filter cake accumulated on said septa during filtering in preparation for a subsequent filtering operation, said removal operation comprising the steps of removing at least a portion of said liquid to be filtered from said inlet chamber, introducing liquid into said outlet chamber so that said liquid flows into the interior of said tubular septa and outwardly thereof into said inlet chamber to flush said septa, trapping said liquid in said inlet chamber so that the level of liquid therein rises, and concurrently with the rise of trapped liquid introducing a plurality of jets of air into said inlet chamber to agitate said liquid therein to scrub the exterior of said septa, and draining the removed filter cake and liquid from said filter tank.

5. A filtering process comprising the steps of passing a liquid to be filtered through a filter tank having a plurality of tubular vertically extending septa therein and defining an inlet chamber on the external walls of said septa and in a lower portion of said tank and an outlet chamber on the interior of said tubular septa and in an upper portion of said tank whereby a filter cake is built up on the external walls of said septa during filtering, and removing the filter cake accumulated on said septa during filtering in preparation for a subsequent filtering operation, said removal operation comprising the steps of removing at least a portion of said liquid to be filtered from said inlet chamber, introducing liquid into said outlet chamber so that said liquid flows into the interior of said tubular septa and outwardly thereof into said inlet chamber to flush said septa, trapping said liquid in said inlet chamber so that the level of liquid therein rises progressively along the external walls of said septa, and, while said liquid is flowing outwardly through said septa to flush the same and the level of the liquid is rising along the external walls of said septa, introducing an air stream into said inlet chamber to agitate said liquid therein to scrub the exterior walls of said septa progressively along the vertical extent thereof.

6. A filtering process according to claim 5 wherein said air stream is introduced into said inlet chamber at a plurality of spaced locations in the form of jets of air.

7. A filtering process according to claim 5 wherein the step of introducing liquid into said outlet chamber during the removal of filter cake step is terminated when the inlet chamber is filled with liquid to a level of at least above the top of said vertically extending septa.

References Cited by the Examiner

UNITED STATES PATENTS

| | | | |
|---|---|---|---|
| 1,771,928 | 7/1930 | Jung | 210—333 X |
| 2,784,846 | 3/1957 | Olson et al. | 210/333 |
| 2,854,142 | 9/1958 | Baker | 210/332 |

REUBEN FRIEDMAN, *Primary Examiner.*

D. M. RIESS, *Assistant Examiner.*